United States Patent Office 3,429,619
Patented Feb. 25, 1969

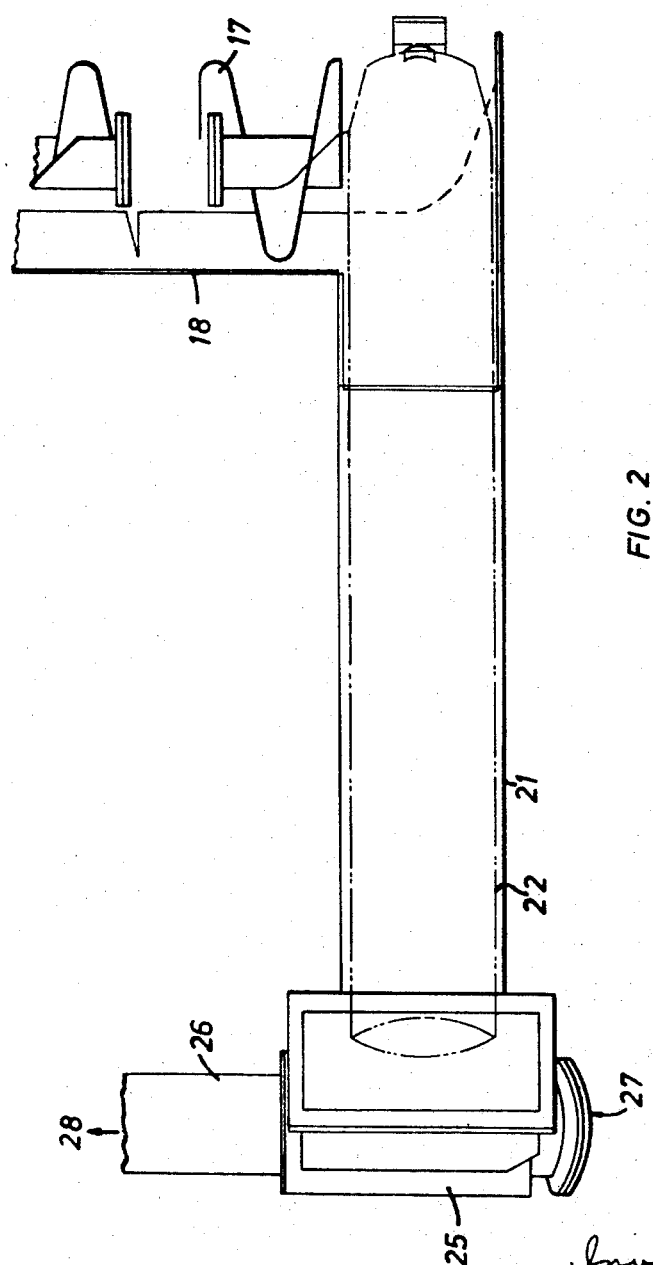

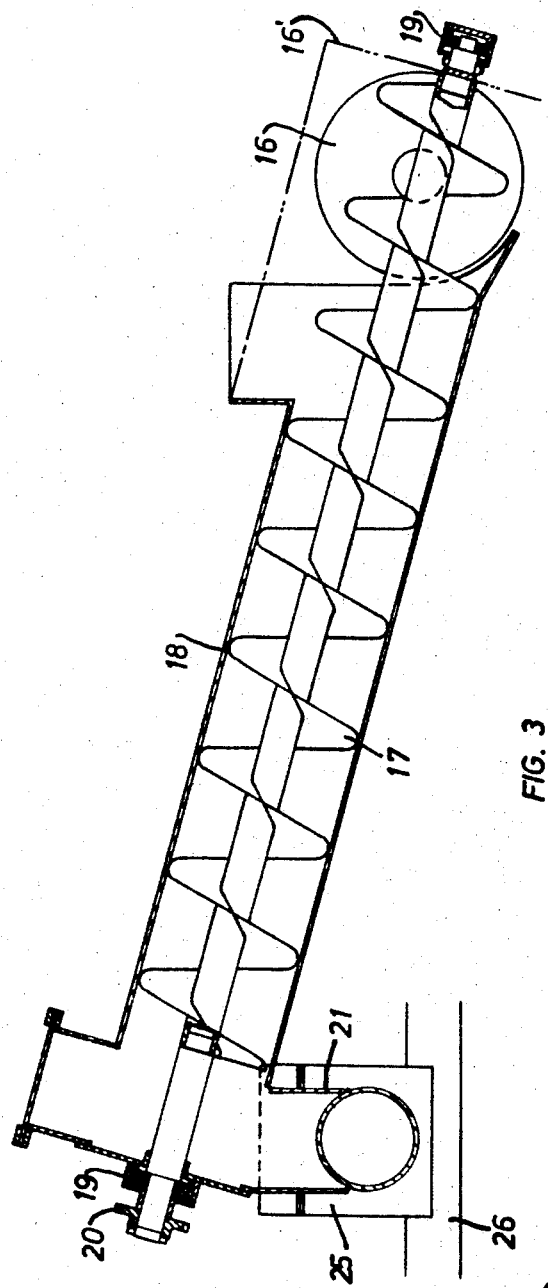

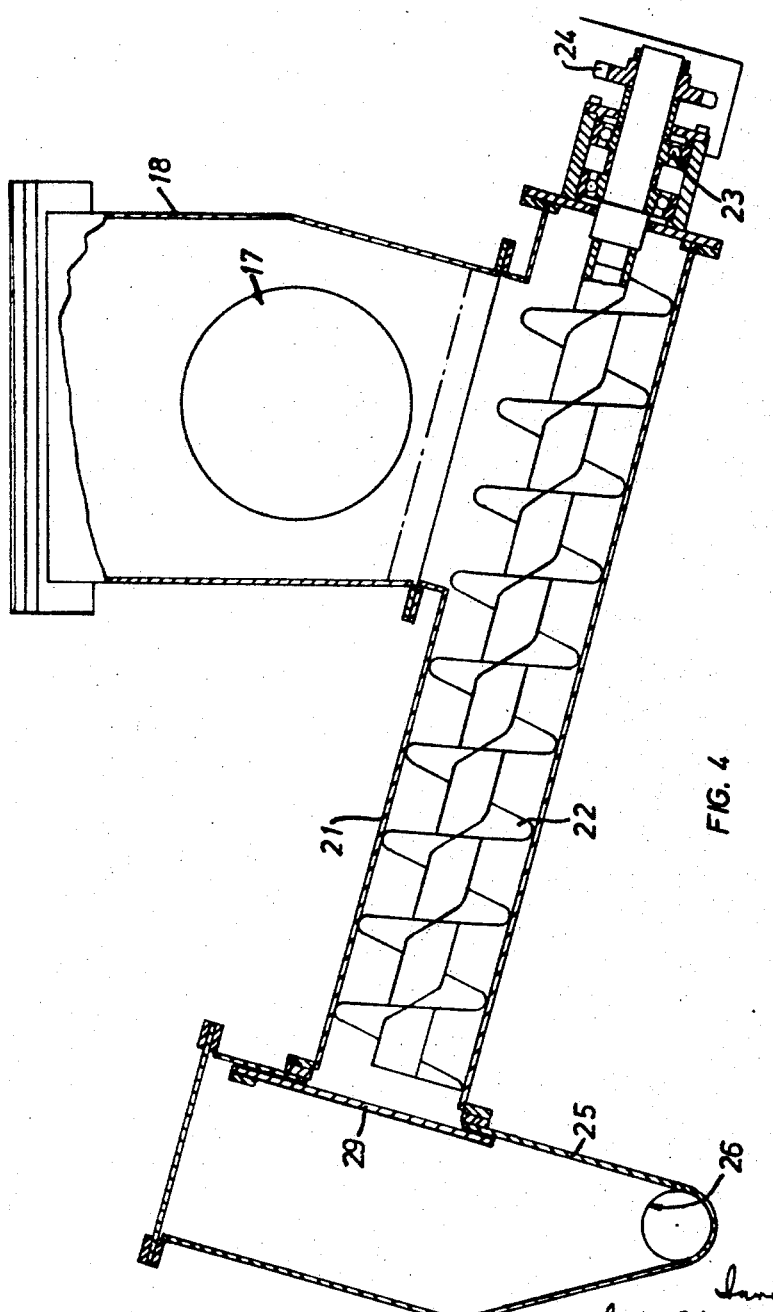

3,429,619
SILO UNLOADER
Claes Martin Weibull, Malmo, Sweden, assignor to Ingeniorsfirman Nils Weibull AB, Malmo, Sweden
Filed Aug. 25, 1967, Ser. No. 663,302
Claims priority, application Sweden, Sept. 1, 1966, 11,766/66
U.S. Cl. 302—50      5 Claims
Int. Cl. B65g 53/42, 33/14

ABSTRACT OF THE DISCLOSURE

In a silo for bulk storage of particulate material there is provided between the discharge end of a scraping type conveyor feeding the stored material at the surface thereof, and a pressurized air flow conduit, screw conveyor means feeding the material from the discharge end of the scraping type conveyor into said conduit, such material being conveyed through said conduit by the pressurized air flow therein.

---

Figure 1:
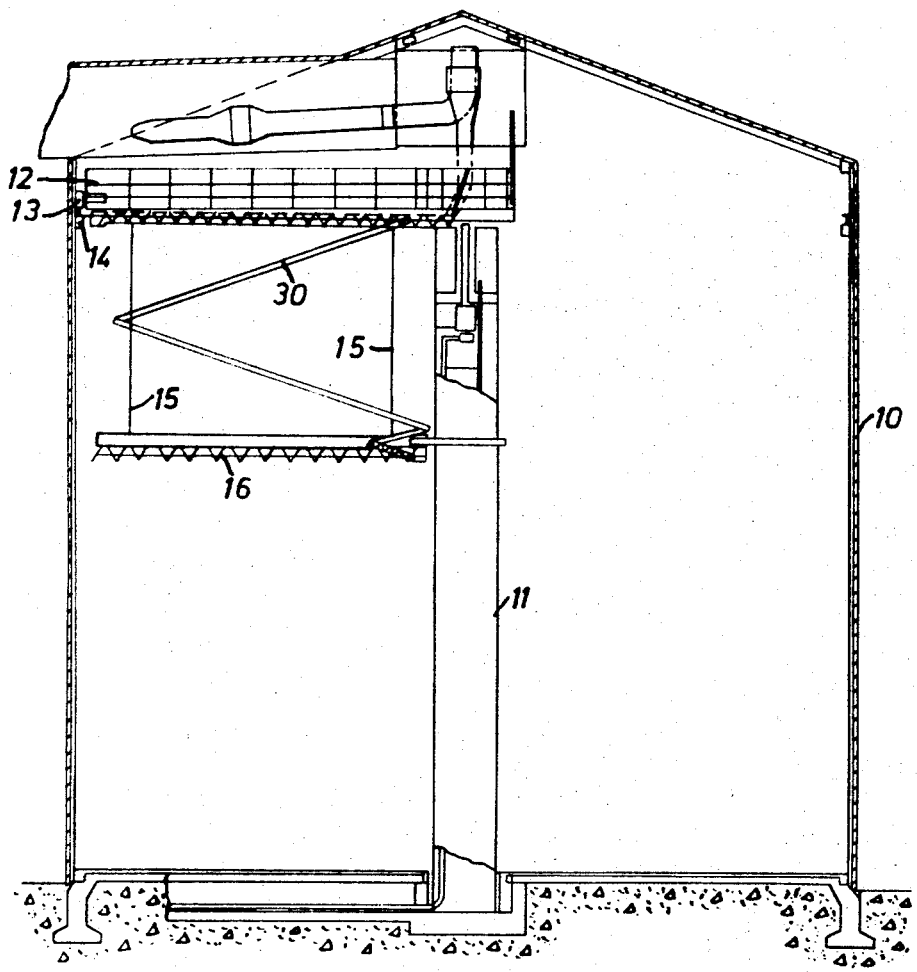

This invention relates to silos for bulk storage of particulate material such as starch, fertilizer, cement, etc., having a screw or scraper-type conveyor for conveying the stored material on the surface thereof to a delivery region, and means for discharging the material from the silo at said delivery region.

For emptying such silos use is made of mechanical conveying means which feeds the material from the delivery region of the screw or scraper-type conveyor outwardly of the silo, usually through a central column in the silo, or of suction means which convey the material by sucking action through a hose or pipeline. The sucking means are more flexible in operation than mechanical conveying devices such as screw, bucket or belt conveyors, since they can carry the material along paths of practically any extension whatever. The capacity of a suction means, however, is extremely limited if the installation costs should be kept at a reasonable level. The method, applied in connection with small-size storage and transport containers, of conveying the material by means of a stream of pressurized air provides a considerably greater capacity at the same installation costs compared to the conveyance by sucking action and is preferable from economical viewpoints, but this latter method has not been practised hitherto in silos presumably because one has not succeeded in finding a satisfactory solution of the problem of preventing the pressurized air employed to convey the material from penetrating into the silo where one usually wants to maintain an air volume which as far as possible is stationary moisture.

The invention relates to a silo of the type outlined in the foregoing, in which pressurized air is employed to empty the silo and which sufficiently safely ensures that pressurized air is not extensively admitted to the silo.

The main characteristic feature of the silo provided according to the invention is that the discharge means comprises screw conveyor means disposed between the screw or scraper-type conveyor and a pressurized air conduit for feeding the material out of the silo by means of a flow of pressurized air in said conduit, and said screw conveyor means includes a conveyor screw enclosed by a housing which has the discharge end connected to the pressurized air conduit to feed the conveyed material thereinto.

For better illustration, the invention will be more fully described in the following with reference to the accompanying drawings which illustrate an embodiment of the silo.

In the drawings:
FIGURE 1 is a slightly diagrammatic elevational sectional view of a silo of a common type, chosen by way of example;
FIGURE 2 is a fragmentary and partly diagrammatic plan view of the screw conveyor means disposed between the screw or scraper-type conveyor and the pressurized air conduit, said screw conveyor means comprising two individual conveyor screws;
FIGURE 3 is a side elevation of a first conveyor screw with the housing thereof shown in section; and
FIGURE 4 is a corresponding side elevation of the second conveyor screw with the housings of said first and second conveyor screws as well as the pressurized air conduit shown in section.

The silo illustrated in the drawings comprises a cylindrical structure 10 including a floor, side walls and a roof. Disposed at the center of the silo is a column 11. A power-driven beam 12 has the inner end journaled on and supported by column 11, and wheels 13 are mounted at the outer end of said beam to ride on a rail 14 arranged around the inner wall surface of the silo, at least one of said wheels being driven by an electric motor to rotate the beam 12 on the central column 11.

For filling material into the silo a distributing conveyor extending along the beam 12 can be connected to a stationary supply pipe which can be rotated together with the beam 12. The filling device being irrelevant to the present invention and besides generally known in several forms, no detailed description of the filling device will be given here.

A vertically adjustable screw conveyor 16 is guided on the central column 11 and suspended in cables 15 from the beam 12, said screw conveyor serving to empty the silo and being therefore arranged to feed the stored material from the periphery of the silo toward the central column 11 by scraping layer by layer of the material toward said central column while the beam 12 and consequently the conveyor 16 are rotated about the central column. Screw conveyor means including two conveyor screws making substantially right angles to each other, is connected to the radially inner end of the conveyor 16 to pass on the material which has been moved toward the central column 11. One conveyor screw, designated 17, has one end connected at right angles to the conveyor 16 at the discharge or delivery end thereof and is enclosed by a housing 18 which is rigidly connected to the frame of the conveyor 16, as is indicated by a dash-and-dot line 16' in FIGURE 3. The conveyor screw 17 has its two ends mounted respectively in the housing and the frame at 19 and has a sprocket wheel 20 to be driven from a separate electric motor. It is slightly inclined in an upward direction from the conveyor 16 so that at the conveyance of the material at right angles from the delivery end of the conveyor 16 it will simultaneously raise the material to a point above the surface of the material stored in the silo. The housing 21 of the other conveyor screw, designated 22, is connected to the housing 18 at the underside thereof at the delivery end of the conveyor screw 17. Conveyor screw 22 extends at right angles to the conveyor screw 17 and has one end mounted in cantilever fashion in the housing 21 at 23 and provided with a sprocket wheel 24 to be driven from a separate electric motor. The conveyor screw 16 thus serves to feed the material from above into the housing 21 in which the material is carried forward by the conveyor screw 22 which likewise raises the material to a higher level. At the end opposed to the mounting means 23 the housing 21 is connected to a box 25 which at the lower end communicates with a pressurized air conduit 26 which is supplied with pressurized air at the arrow 27 and discharges it at the arrow 28 after the air has passed the box 25 (see FIGURE 2). Disposed between the housing 21 and interior of the box 25 is a non-return valve in the form of a flap 29 of elastic material which permits the material to pass from the housing 21 to the box 25 but prevents the material as well as the air from flowing in the opposite direction.

The pressurized air conduit 26 on the discharge side leads out of the silo, and the part of the air conduit extending as an articulated pipeline or a flexible hose between the box 25 and the beam 12 can be placed on a conduit support 30 which extends between the beam 12 and the conveyor 16 and is articulated at the middle to permit raising and lowering the conveyor according to the level of the material in the silo. Also an articulated pipeline or flexible hose which is connected to the input of the pressurized air conduit at 27 and is in communication with a compressor (not shown) outside the silo can be placed on the conduit support 30. Moreover, electrical conductors for supplying power to the motors connected to the conveyor screws can be positioned on the conduit support, and possibly also the requisite leads for control apparatus.

The material which the conveyor 16 has moved toward the central column 11 is fed by the conveyor screw 17 to the conveyor screw 22 which in turn feeds the material to the box 25 from which the air flow in the pressurized air conduit 26 passing through the box carries the material along to move it out of the silo to a discharge place. To prevent the air in the box 25 from rushing into the interior of the silo through the furrow of the conveyor screw 22 and taking along the material therein, the conveyor screw 22 should as far as possible operate with 100 percent volumetric efficiency so that the material in said conveyor screw forms a plug impeding the flow of air therethrough, which can be realized by suitable adaptation of the capacity of the conveyor screw 22 to those of the conveyors 16 and 17. Suitably, the conveyor screw 22 operates at a higher r.p.m. than the conveyor screw 17, but in compensation has a smaller diameter than said last mentioned conveyor screw, so as to have approximately the same capacity as said screw. When the furrow of the conveyor screw 22 is empty or almost empty of material the nonreturn valve 29 prevents air from entering the silo through such screw. The drive for all conveyor screws can have means for causing the conveyor screw in question to be automatically and temporarily stopped when material clogs in the conveyor screw.

While the invention has been described and shown in an embodiment chosen by way of example, it is readily seen by those skilled in the art that modifications can be resorted to within the scope of the appended claims.

What I claim and desire to secure by Letters Patent is:

1. A silo for bulk storage of particulate material, such as starch, fertilizer, cement, etc., comprising a scraper-type conveyor for conveying the material stored in the silo, on the surface thereof to a delivery region, and means for conveying the material from said delivery region out of the silo, wherein a screw conveyor having a conveyor screw and a housing enclosing it is provided in the delivery region of the scraper-type conveyor for the further conveyance of the material, said screw conveyor being directed obliquely upwardly and opening into a container which is connected to a source of pressurized air outside the silo and has an outlet through which the material is discharged from said container and means to prevent flow of said pressurized air into the silo.

2. A silo as claimed in claim 1, wherein said scraper-type conveyor includes a further screw conveyor extending from said conveyor screw, said further screw conveyor being inclined upwardly from said delivery region to feed material therefrom to said conveyor screw while raising such material to supply the material from above to said housing.

3. A silo as claimed in claim 1, wherein said last named means comprises a non-return valve disposed between said housing of said conveyor screw and said container, said valve permitting material to pass from said housing into said container while preventing pressurized air and material from passing in the opposite direction.

4. A silo as claimed in claim 1, further comprising means mounting said housing of said conveyor screw in cantilever fashion at the inlet end of said conveyor screw, and a non-return valve disposed between said housing at the discharge end of said conveyor screw and said container, said valve permitting material to pass from said housing into said container while preventing pressurized air and material from passing in the opposite direction.

5. A silo as claimed in claim 4, wherein said scraper-type conveyor includes a further screw conveyor extending from said conveyor screw, said further screw conveyor being inclined upwardly from said delivery region to feed material therefrom to said conveyor screw at the inlet end thereof while raising such material to supply the material from above to said housing.

References Cited

UNITED STATES PATENTS

| | | | |
|---|---|---|---|
| 2,404,884 | 7/1946 | Pieper | 302—50 |
| 2,500,043 | 3/1950 | Radtke | 302—56 |
| 2,888,253 | 5/1959 | Van Dusen | 302—56 |

ANDRES H. NIELSEN, *Primary Examiner.*

U.S. Cl. X.R.

302—56